(12) United States Patent
Hupp et al.

(10) Patent No.: US 7,862,647 B2
(45) Date of Patent: Jan. 4, 2011

(54) GAS ADSORPTION AND GAS MIXTURE SEPARATIONS USING MIXED-LIGAND MOF MATERIAL

(75) Inventors: Joseph T. Hupp, Northfield, IL (US); Karen L. Mulfort, Chicago, IL (US); Randall Q. Snurr, Evanston, IL (US); Youn-Sang Bae, Evanston, IL (US)

(73) Assignee: Northwestern University, Evanston, IL (US)

( * ) Notice: Subject to any disclaimer, the term of this patent is extended or adjusted under 35 U.S.C. 154(b) by 186 days.

(21) Appl. No.: 12/317,774

(22) Filed: Dec. 29, 2008

(65) Prior Publication Data

US 2009/0178558 A1 Jul. 16, 2009

Related U.S. Application Data

(60) Provisional application No. 61/010,013, filed on Jan. 4, 2008.

(51) Int. Cl.
*B01D 53/02* (2006.01)
(52) U.S. Cl. .............................. 95/139; 95/96; 95/148; 95/900; 423/220; 423/230
(58) Field of Classification Search .................... 95/96, 95/139, 148, 900; 423/220, 230
See application file for complete search history.

(56) References Cited

U.S. PATENT DOCUMENTS

| | | | | |
|---|---|---|---|---|
| 5,648,508 A * | 7/1997 | Yaghi | .............. | 556/9 |
| 6,491,740 B1 * | 12/2002 | Wang et al. | .................... | 95/90 |
| 7,556,673 B2 * | 7/2009 | Schubert et al. | ............... | 95/139 |
| 7,744,842 B2 * | 6/2010 | Farha et al. | .................. | 423/282 |
| 2005/0124819 A1 * | 6/2005 | Yaghi et al. | .................. | 556/148 |
| 2008/0121105 A1 * | 5/2008 | Schubert et al. | ............... | 95/139 |
| 2009/0220400 A1 * | 9/2009 | Farha et al. | .................. | 423/228 |
| 2010/0064888 A1 * | 3/2010 | Schubert et al. | ............... | 95/139 |
| 2010/0170395 A1 * | 7/2010 | Farha et al. | .................... | 95/139 |

OTHER PUBLICATIONS

Simone Cavenati, et al., Removal of Carbon Dioxide from Natural Gas by Vacuum Pressure Swing Adsorption, Energy & Fuels, 2006, 20,pp. 2648-2659.

Simone Cavenati, et al., Adsorption Equilibrium of Methane, Carbon Dioxide, and Nitrogen on Zeolite 13X at Hight Pressures, J. Chem. Eng. Data, 2004, 49, 1095-1101.

Min-Bae Kim, et al., Kinetic Separation of Landfill Gas by a Two-Bed Pressure Swing Adsorption Process Packed with Carbon Molecular Sieve: Nonisothermal Operation, Ind. Eng. Chem. Res., 2006, 45, pp. 5050-5058.

A. Kapoor and R.T. Yang, Kinetic Separation of Methane-Carbon Dioxide Mixture by Adsorption on Molecular Sieve Carbon, Chemical Engineering Science, 1989, 44, pp. 1723-1733.

Yi Li, et al., Novel $Ag^+$-Zeolite/Polymer Mixed Matrix Membranes with High $CO_2/CH_4$ Selectivity, AIChE Journal, 2007, 53, pp. 610-616.

(Continued)

*Primary Examiner*—Robert J Hill, Jr.
*Assistant Examiner*—Christopher P Jones

(57) ABSTRACT

A method of separating a mixture of carbon dioxiode and hydrocarbon gas using a mixed-ligand, metal-organic framework (MOF) material having metal ions coordinated to carboxylate ligands and pyridyl ligands.

12 Claims, 9 Drawing Sheets

OTHER PUBLICATIONS

Peiyuan Li and F. Handan Tezel, Adsorption separation of $N_2$, $O_2$, $CO_2$ and $CH_4$ gases by β-zeolite, Microporous and Mesoporous Materials, 2007, 98, pp. 94-101.

Shiguang Li, et al., SAPO-34 membranes for $CO_2/CH_4$ separation, Journal of Membrane Science, 2004, 241, pp. 121-135.

Xuan Peng, et al., Adsorption Separation of $CH_4/CO_2$ on Mesocarbon Microbeads: Experiment and Modeling, AIChE Journal, 2006, 52, pp. 994-1003.

Jean-Marc Leyssale, et al., Sorption Thermodynamics of $CO_2$, $CH_4$, and Their Mixtures in the ITQ-1 Zeolite as Revealed by Molecular Simulations, J. Phys. Chem. B, 2006, 110, pp. 22742-22753.

Ravichandar Babarao, et al., Storage and Separation of $CO_2$ and $CH_4$ in Silicalite, $C_{168}$ Schwarzite, and IRMOF-1: A Comparative Study from Monte Carlo Simulation, Langmuir, 2007, 23, pp. 659-666.

V. Goetz, et al., Carbon dioxide-methane mixture adsorption on activated carbon, Adsorption, 2006, 12, pp. 55-63.

Randall Q. Snurr, et al., Prospects for Nanoporous Metal-Organic Materials in Advanced Separations Processes, AIChE Journal, 2004, 50, pp. 1090-1095.

Jesse L.C. Roswell and Omar M. Yaghi, Strategies for Hydrogen Storage in Metal-Organic Frameworks, Angew, Chem. Int. Ed., 2005, 44, pp. 4670-4679.

U. Mueller, et al., Metal-organic frameworks—prospective industrial applications, Journal of Materials Chemistry, 2006, 16, pp. 626-636.

Suzy Surblé, et al., Synthesis of MIL-102, a Chromium Carboxylate Metal-Organic Framework, with Gas Sorption Analysis, J. Am. Chem. Soc., 2006, 128, pp. 14889-14896.

Qingyuan Yang and Chongli Zhong, Molecular Simulation of Carbon Dioxide/Methane/Hydrogen Mixture Adsorption in Metal-Organic Frameworks, J. Phys. Chem. B, 2006, 110, pp. 17776-17783.

Qingyuan Yang and Chongli Zhong, Electrostatic-Field-Induced Enhancement of Gas Mixture Separation in Metal-Organic Frameworks: A Computational Study, ChemPhysChem, 2006, 7, pp. 1417-1421.

A.L. Myers and J.M. Prausnitz, Thermodynamics of Mixed-Gas Adsorption, AIChE Journal, 1965, pp. 121-127.

* cited by examiner

GAS ADSORPTION AND GAS MIXTURE SEPARATIONS USING MIXED-LIGAND MOF MATERIAL

RELATED APPLICATION

This application claims benefits and priority of provisional application Ser. No. 61/010,013 filed Jan. 4, 2008.

CONTRACTUAL ORIGIN OF THE INVENTION

This invention was made with government support under contract DE-FG02-01ER15244 awarded by the U.S. Department of Energy. The government has certain rights in the invention.

FIELD OF THE INVENTION

The present invention relates to methods for adsorption of gases such as carbon dioxide in the separation of gas mixtures.

BACKGROUND OF THE INVENTION

Carbon dioxide is often found as an impurity in natural gas and landfill gas, where methane is the major component. The presence of $CO_2$ reduces the energy content of natural gas and can lead to pipeline corrosion (references 1-7). If natural gas meets established purity specifications, it is designated "pipeline quality methane," which increases its commercial value. To meet pipeline requirements, natural gas must comply with strict $CO_2$ concentration limits, as low as 2% (references 1,2,5).

For the separation of $CO_2$ from natural gas, several technologies, such as absorption, cryogenic distillation, membrane separation, and adsorption, have been used. Among these technologies, adsorption-based methods such as pressure swing adsorption (PSA) are promising because of their simple and easy control, low operating and capital investment costs, and superior energy efficiency (references 1, 8, 9). In particular, adsorption is advantageous for the case of medium- and small-size processes (references 1, 9). After the suggestion by Sircar in the late 1980 (reference 10), many studies have been performed on PSA processes for the separation and purification of $CO_2$ from gaseous streams containing $CH_4$ (references 1, 3, 4, 11).

A key step in the design of PSA processes for the separation and purification of $CO_2$ is the selection of a highly selective adsorbent with a high $CO_2$ capacity (references 1, 8, 9, 11). Most studies of $CO_2/CH_4$ separation have focused on zeolites (references 1, 2, 6, 12, 13) and carbon based adsorbents (references 3, 4, 8, 13, 14).

Recently, metal-organic frameworks (MOFs) have been recognized as a new family of porous materials that have potential applications in separations, sensing, gas storage, and catalysis (references 15-17). MOFs consist of metal or metal-oxide corners connected by organic linkers. They are synthesized in a self-assembly process from these well-defined building blocks and have high porosity and well-defined pore sizes. The synthetic strategy opens up the possibility to systematically vary pore size and chemical functionality in the search for an optimal adsorbent. For separations, an additional advantage is that MOFs can be regenerated under milder conditions than most zeolites, which require considerable heating and the associated high costs (reference 18).

To date, most studies of adsorption in MOFs have focused on single-component gases, and little is known about mixture behavior even though understanding multicomponent adsorption equilibrium is essential for designing adsorption-based separation processes. For $CO_2/CH_4$ mixtures in MOFs, all of the published work to date has come from molecular simulation. Yang and Zhong used grand canonical Monte Carlo (GCMC) to simulate mixtures of $CO_2$ and $CH_4$ in Cu—BTC and MOF-5 (references 19-20). At 1 bar and 298 K, they predicted that Cu—BTC has a selectivity of about 6 for $CO_2$ over $CH_4$, and MOF-5 has a selectivity of about 2, independent of gas-phase composition. Babarao used GCMC simulations to compare $CO_2/CH_4$ mixtures in MOF-5, the zeolite silicalite, and $C_{168}$ schwarzite (reference 13). They found that MOF-5 has a larger storage capacity, but the selectively is similar in all three materials. Both groups report that the simulated mixture behavior matches well with the behavior calculated from single-component isotherms using the ideal adsorbed solution theory (IAST) (references 13, 19, 21).

SUMMARY OF THE INVENTION

The present invention provides in one embodiment a method for selectively adsorbing carbon dioxide in the separation of carbon dioxide from a gas mixture using a material having a mixed-ligand, metal-organic framework (MOF) that includes dicarboxylate ligands and dipyridyl ligands.

The method is useful to separate carbon dioxide from a mixture of carbon dioxide and a hydrocarbon gas, such as, for example, methane, propane, and/or propylene, by contacting the gas mixture and the MOF material that selectively adsorbs carbon dioxide from the mixture. The invention is advantageous for the selective removal of carbon dioxide from natural gas, landfill gas, and other gas mixtures of $CO_2$ and $CH_4$.

In an illustrative embodiment of the invention, the MOF material useful in practice of the method is formed by Zn(II) coordination to dicarboxylate ligands and dipyridyl ligands such as, for example, a material represented by the formula $Zn_2(NDC)_2(DPNI)$ where NDC represents 2,6-naphthalenedicarboxylate and DPNI represents N,N'-di-(4-pyridyl)-1,4,5,8-napthalene tetracarboxydiimide. This MOF material has an open-framework featuring paddle-wheel type coordination geometry of Zn(II) pairs in two dimensions and pyridyl ligand pillaring in the third dimension.

Other advantages and features of the present invention will become apparent from the following detailed description taken with the following drawings.

DETAILED DESCRIPTION OF THE INVENTION

Figure 1A:
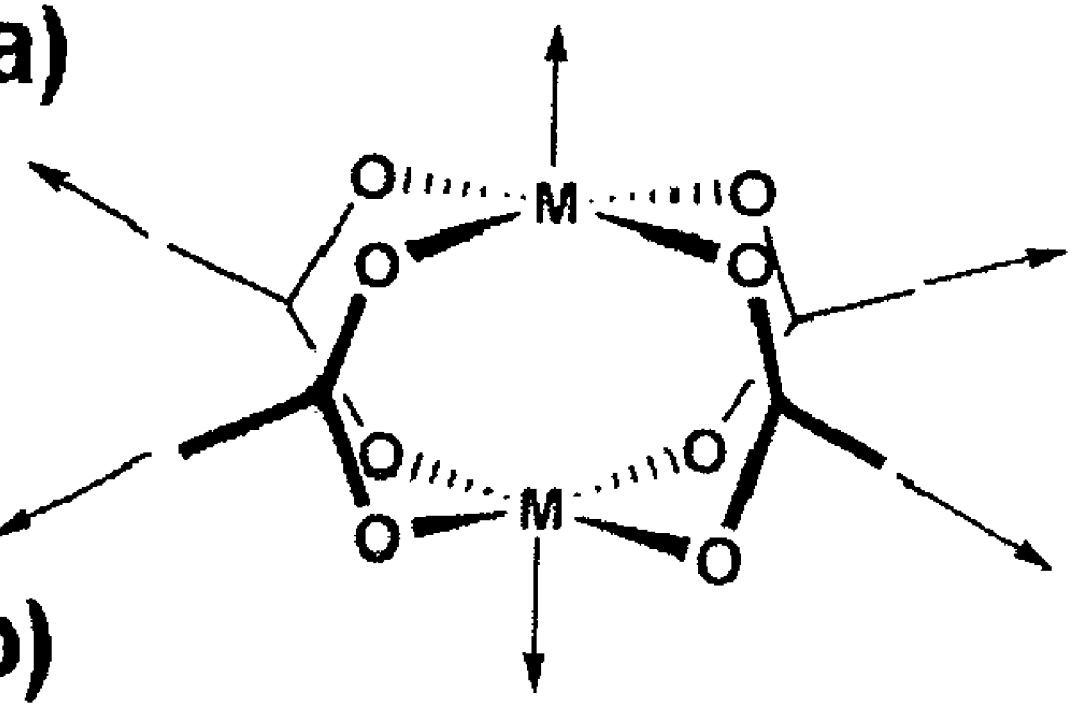
FIG. 1a shows a mixed-ligand paddlewheel coordination geometry (M=Zn).
Figure 1B:
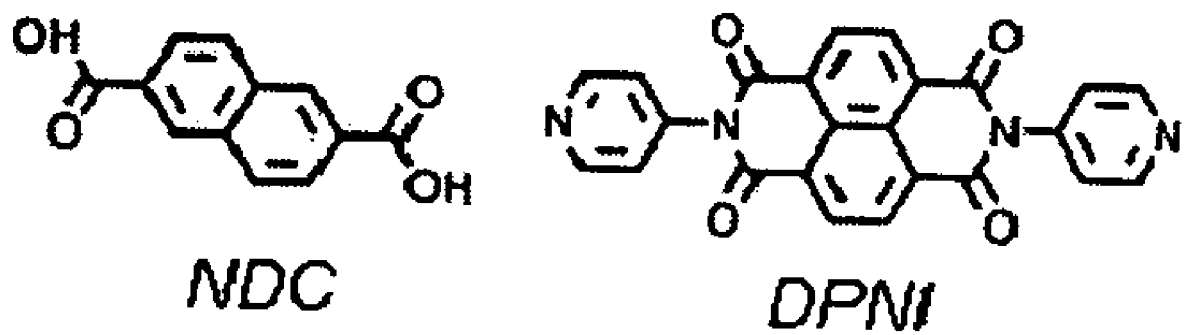
FIG. 1b shows chemical structure of MOF ligands NDC and DPNI.

An embodiment of the present invention provides a method for selectively adsorbing carbon dioxide in the separation of carbon dioxide and hydrocarbon gas, such as for example methane, using a material having a mixed-ligand, metal-organic framework (MOF) that includes dicarboxylate ligands and dipyridyl ligands. The method is useful to separate carbon dioxide from a gas mixture by contacting the gas mixture and the MOF material that selectively adsorbs carbon dioxide from the mixture. For purposes of illustration and not limitation, the method can be can be used to separate carbon dioxide from a gas mixture that includes carbon dioxide and methane, propane, and/or propylene. For purposes of further illustration and not limitation, the method of the invention can be practiced to carry out the well known pressure swing adsorption (PSA) process wherein carbon dioxide of the mixture is adsorbed on the MOF material at relatively high pressure followed by a reduction in pressure for carbon dioxide desorption to regenerate the material. Substantially reversible carbon dioxide adsorption on and desorption from the MOF material can occur in practice of the PSA process and others. The invention is advantageous for the selective removal of carbon dioxide from natural gas, landfill gas, and other gas mixtures of $CO_2$ and $CH_4$.

In an illustrative embodiment of the invention, the MOF material used in practice of the method is formed by Zn(II) coordination to dicarboxylate ligands and dipyridyl ligands. An illustrative MOF material for practice of the method of the invention is represented by the formula $Zn_2(NDC)_2(DPNI)$ where NDC represents 2,6-naphthalenedicarboxylate and DPNI represents N,N'-di-(4-pyridyl)-1,4,5,8-napthalene tetracarboxydiimide. This MOF material has a mixed-ligand, open-framework featuring paddle-wheel type coordination geometry of Zn(II) pairs in two dimensions and pyridyl ligand pillaring in the third dimension. Such a MOF material and its synthesis are described by Bao-Qing Ma et al. in *Inorganic Chemistry*, Vol. 44, No. 14, pp. 4912-4914, 2005, the teachings of which are incorporated herein by reference. Although Zn(II) coordination to dicarboxylate ligands and dipyridyl ligands is described herein, the MOF material can embody any suitable metal cation, M, other than Zn(II) in lieu of or in addition to Zn(II) ions.

EXAMPLES

For purposes of illustration and not limitation, a particular illustrative MOF material described above can be made by Zn(II) (i.e. $Zn^{+2}$ cation) coordination to dicarboxylate ligands and dipyridyl ligands. As described below, the MOF can be synthesized by two routes: first route is at 80° C. for two days with conventional heating and second route is at 120° C. for 1 hour using microwave heating.

Although the two as-synthesized samples exhibit very similar powder x-ray diffraction patterns, evacuated samples show differences in nitrogen uptake. From the single-component $CO_2$ and $CH_4$ isotherms, mixture adsorption was predicted using the ideal adsorbed solution theory (IAST). The microwave sample shows a selectivity of approximately 30 for $CO_2$ over $CH_4$, which is among the highest selectivities reported for this separation.

Experimental and Simulation Methods:

Materials Synthesis and Characterization

The mixed-ligand MOF ($Zn_2(NDC)_2(DPNI)$), designated compound 1, (NDC=2,6-naphthalenedicarboxylate, DPNI=N,N'-di-(4-pyridyl)-1,4,5,8-naphthalene tetracarboxydiimide) was synthesized first by the conventional route (designated compound 1-C) by heating in a fluid (oil) bath for two days to effect slow crystallite growth (i.e. see Bao-Qing Ma et al. in *Inorganic Chemistry*, Vol. 44, No. 14, pp. 4912-4914, 2005, the teachings of which are incorporated herein by reference). The material was also prepared by a microwave-assisted method (designated compound 1-M), which allows the rapid and efficient production of several isoreticular MOFs (IRMOFs) with uniform crystal size, see reference 32.

Commercial reagents were purchased from Sigma-Aldrich (ACS grade) and used as received unless otherwise noted. The syntheses of N,N'-di-(4-pyridyl)-1,4,5,8-naphthalenetetracarboxydiimide (DPNI) and compound 1-C have previously been reported. A sample preparation follows: $Zn(NO_3)_2 \cdot 6H_2O$ (600 mg, 2.0 mmol), $H_2NDC$ (87 mg, 0.4 mmol), DPNI (170 mg, 0.4 mmol), and 200 ml DMF were added to a 500-ml flat-bottom flask. The flask was sonicated until all contents were dissolved and placed in an 80° C. oil bath for two days. The bright yellow crystalline product was removed from the flask, isolated via filtration, washed with DMF, and allowed to dry in air. $Zn_2(NDC)_2(DPNI)$ (compound 1-C) recovered: 239 mg, 18% yield based on zinc. The microwave-assisted synthesis of compound 1 was carried out using an Initiator Microwave Synthesizer from Biotage. Slightly different conditions were discovered to yield compound 1 through microwave-assisted synthesis. It should be stressed that the exact same conditions (i.e. component ratio and temperature) were attempted and did not yield a pure phase of compound 1 by means of microwave heating. A sample preparation follows: $Zn(NO_3)_2 \cdot 6H_2O$ (600 mg, 2.0 mmol), $H_2NDC$ (217 mg, 1.0 mmol), DPNI (214 mg, 0.5 mmol), and 200 ml DMF were combined in a 250-ml Erlenmeyer flask. The flask was sonicated until all contents were dissolved. The solution was divided equally among 10 20-ml capacity microwave vials. Each vial was microwave heated without stirring at 120° C. for 1 hour and allowed to stand overnight. The yellow microcrystalline powder was removed from each vial, isolated via filtration, washed with DMF, and allowed to dry in air. $Zn_2(NDC)_2(DPNI)$ (compound 1-M) recovered: 362 mg, 27% yield based on zinc.

Powder X-ray diffraction (PXRD) patterns were recorded with a Rigaku XDS 2000 diffractometer using nickel-filtered Cu Kα radiation (λ=1.5418 Å) over a range of 5°<2θ<40° in 0.1° steps with a 1-s counting time per step. Powder samples were placed in the diffractometer mounted on a stainless steel holder with double-sided tape. Thermogravimetric analyses (TGA) were performed on a Mettler-Toledo TGA/SDTA851e. Samples (3-5 mg) in alumina pans were heated from 25° C. to 700° C. at 10° C./minute under $N_2$. Nitrogen adsorption isotherms were measured with an Autosorb 1-MP from Quantachrome Instruments. Samples of a known weight (35-50 mg) were loaded into a sample tube and evacuated at 110° C. under $10^{-5}$ torr dynamic vacuum for 24 hours. After evacuation, the sample and tube were precisely weighed again to obtain the evacuated sample weight. The Brunauer-Emmett-Teller (BET) surface area was determined in the range $0.007<P/P_o<0.05$; the Dubinin-Raduskevich (DR) micropore volume was determined in the range $10^{-5}<P/P_o<0.01$ since the micropores fill at very low relative pressures.

Adsorption Measurements:

The adsorption isotherms of $CO_2$ and $CH_4$ on both evacuated samples (compound 1-C' and compound 1-M") were measured volumetrically at 296 K up to 18 atm. Before each measurement, a 40-60 mg sample was evacuated at 110° C. overnight, and the void volume of the system was determined by using He gas. $CO_2$ (99.9%) and $CH_4$ (99%) were obtained from Airgas Inc. (Radnor, Pa.). Prior to analysis, gases were passed through molecular sieves to remove residual moisture. Equilibrium pressures were measured with an MKS Baratron transducer 627B (accuracy ±0.12%). Adsorbate was dosed into the system incrementally, and equilibrium was assumed when no further change in pressure was observed (within 0.01 kPa).

Figure 9:
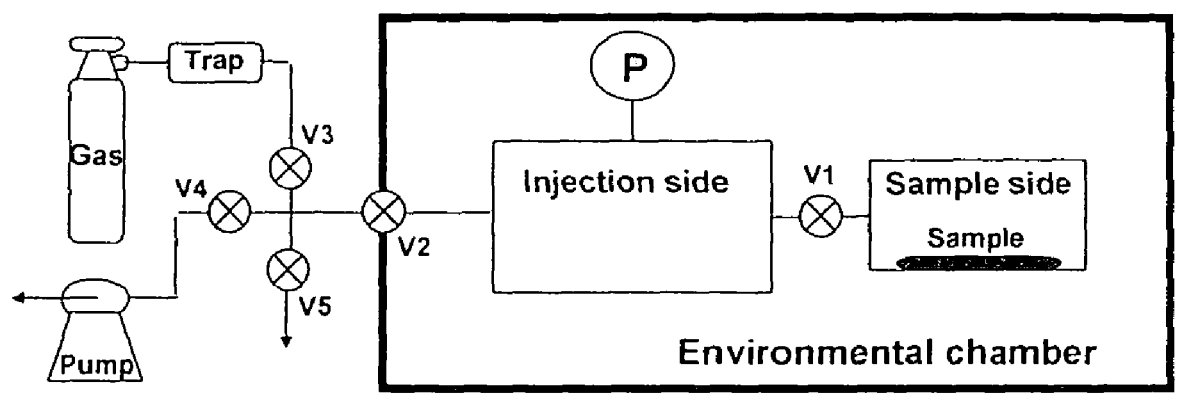
FIG. 9 is a schematic diagram of high-pressure adsorption apparatus employed in testing the MOF materials of the invention.

In particular, a volumetric-type apparatus (FIG. 9) was used to measure the adsorption equilibria of $CO_2$ and $CH_4$ in compound 1-C' and compound 1-M' at 296 K and 0-18 atm. It was composed of an injection side, a sample side, a vacuum pump, valves V1 through V5, and a pressure transducer P. Both sides and all the lines were located in an environmental chamber to maintain a constant temperature. The volumes of the injection and sample sides were measured by He gas. Equilibrium pressures were measured with an MKS Baratron transducer 627B (accuracy ±0.12%). The pressure change was monitored in real time using LabVIEW software (version 7.1). After an adsorbate in the injection side was stabilized at constant T and P, the adsorbate was supplied from the injection side to the sample side so as to contact the sample. Then, the adsorption isotherms were measured by the stepwise pressure change.

Since the closed system consisted of an adsorbent and an adsorbate at a constant volume, the sum of the moles of adsorbate in the adsorbent and the gas phase was constant during each step. Hence, the adsorbed amounts per unit adsorbent mass were calculated by the mass balance for a pure gas in the injection and sample sides (equation S1) incorporated with the generalized virial-coefficient correlation (equation S2) [Bae and Lee, Carbon (2005) 43, 95]:

$$\frac{PV}{zRT}\bigg|_{\substack{\text{Moles of gas} \\ \text{in the injection side} \\ \text{before value open}}} + \frac{PV}{zRT}\bigg|_{\substack{\text{Moles of gas} \\ \text{in the sample side} \\ \text{before value open}}} = \quad (S1)$$

$$\frac{PV}{zRT}\bigg|_{\substack{\text{Moles of gas} \\ \text{in the total system} \\ \text{after value open}}} + M\bigg|_{\text{Mass of absorbent}} \cdot q$$

$$z = 1 + \left(0.083 - \frac{0.422}{T_r^{1.6}}\right) \cdot \frac{P_r}{T_r} + \omega \cdot \left(0.139 - \frac{0.172}{T_r^{4.2}}\right) \cdot \frac{P_r}{T_r} \quad (S2)$$

The volumetric apparatus was tested to be leak-free using He gas. In addition, the accuracy of the system was proved by measuring $CO_2$ adsorption on NaY zeolite (CBV 100, Zeolyst), where the expected adsorption is known from prior reports in the literature.

GCMC Simulations:

Carbon dioxide and methane adsorption was modeled using GCMC with a version of multipurpose simulation code MUSIC (reference 35) modified to handle non-orthorhombic cells. The framework was considered rigid with coordinates from Ma et al article (reference 22). The rigid framework and mobile $CO_2$ molecules were modeled atomistically, while methane was treated as a united atom sphere. Dispersion and repulsion interactions were modeled with a 12-6 Lennard-Jones potential between all atoms within a 12.8 Å cutoff. The Lennard-Jones parameters for the framework atoms were from the DREIDING force field, reference 36. Methane parameters were obtained from Goodbody et al. reference 37, while $CO_2$ parameters came from the TraPPE potential, reference 38. This model places a Lennard-Jones center on each carbon and oxygen atom. Additionally, charges of −0.35, +0.70, and −0.35 are given to the oxygen, carbon, and oxygen, respectively, in order to represent the molecule's quadrupole moment. The C—O bond length is 1.16 Å, and the bond angle is 180 degrees. Lorentz-Berthelot mixing rules were employed to calculate sorbate/framework and $CO_2/CH_4$ Lennard-Jones parameters.

Partial charges for the MOF framework atoms were calculated with density functional theory (DFT) using the quantum chemical package Gaussian03, reference 39. The exchange and correlation functional by Perdew, Burke, and Ernzerhof, references 40 and 41, was employed with a 6-31+G* basis set, which includes one diffuse and one polarization function on atoms heavier than He. The CHelpG method (see reference 42) was used to calculate charges from the DFT results with atomic radii obtained from Bondi reference 43. Similar methods have been employed previously to estimate charges and binding energies in MOFs (see references 19, 20, 44-47). Representative clusters were chosen from the MOF framework for the DFT calculations. Each cluster consisted of one of the organic linker molecules coordinated to metal corner units on both ends. The metal corner was terminated with methyl or amine groups where the other organic linkers would normally exist. The clusters were used to provide atomic charges for both the organic units, as well as the metal corner. Ewald summation was used to calculate the electrostatic interactions in the GCMC simulations.

GCMC simulations were completed for single component isotherms of $CO_2$ and $CH_4$ separately, as well as for a variety of mixtures. The pure component and mixture fugacities needed as inputs to the simulations were calculated using the Peng-Robinson equation of state. The binary interaction parameter was assumed to be zero. Each step in the Monte Carlo routine consisted of the insertion of a new molecule, deletion of an existing molecule, translation, or rotation of an existing molecule. A total of 10 million steps were used, the first 50% for equilibration and the last 50% to calculate the ensemble averages. Using the method of Myers and Monson reference 48, excess adsorption isotherms were generated from the simulated (absolute) results in order to compare with experimental data.

Figure 2A:
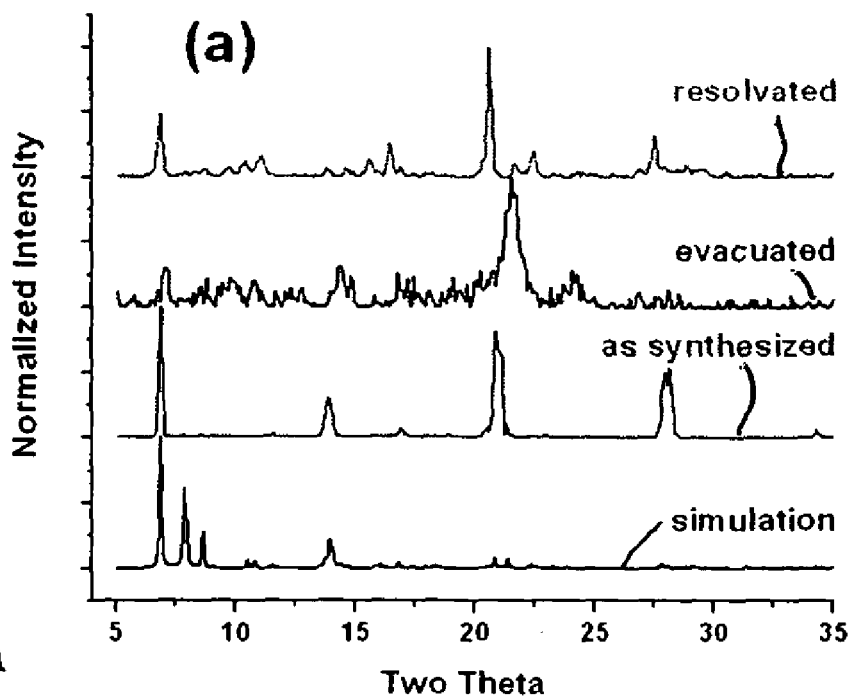
FIGS. 2a and 2b are powder X-ray diffraction patterns for (a) compound 1-C and (b) compound 1-M for simulated, as-synthesized, evacuated, and resolvated samples.
Figure 2B:
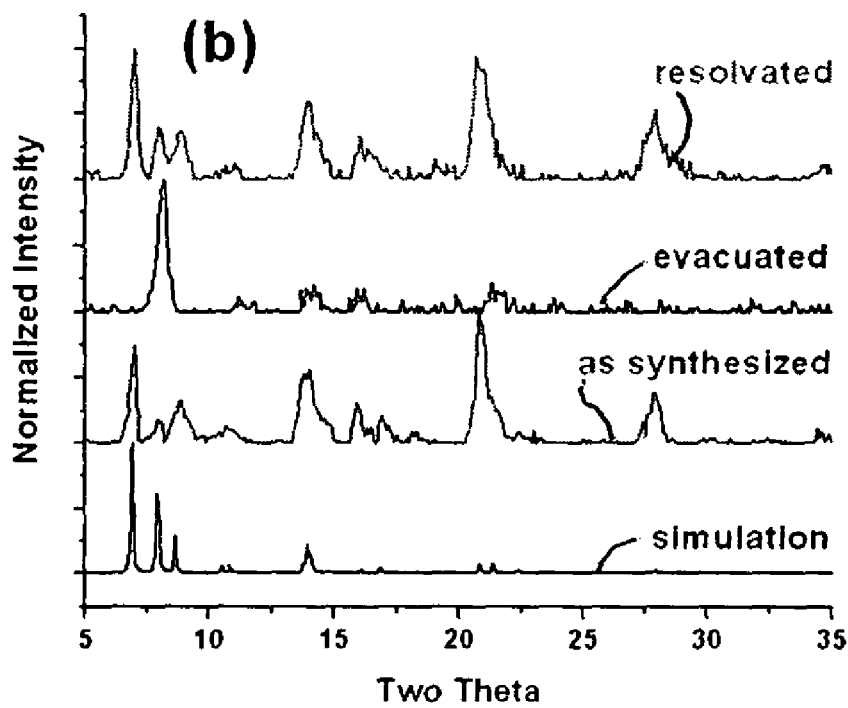

Results of Characterization:

The crystal structure for the mixed-ligand MOF, $Zn_2$(NDC)$_2$(DPNI) (1-C), synthesized by the conventional method has been reported previously; e.g. Bao-Qing Ma et al. in *Inorganic Chemistry*, Vol. 44, No. 14, pp. 4912-4914, 2005, the teachings of which are incorporated herein by reference. The crystals from the microwave synthesis (compound 1-M) were too small for single-crystal structure determination. Both as-synthesized materials (compounds 1-C and 1-M) showed fairly uniform rectangular crystallites, but the crystal size of compound 1-M (150 μm×20 μm) was considerably smaller than that of compound 1-C (400 µm×150 µm). As shown in FIG. 2, both as-synthesized materials gave powder x-ray patterns that closely match the simulated pattern, although compound 1-M has noticeably weaker crystallinity and more line broadening than compound 1-C. Also the relative intensities of low-angle peaks (2θ=7~9°) are weaker for compound 1-C and compound 1-M compared to the simulated PXRD pattern. It has been recently reported that, for MOFs with a large void fraction, the intensities of the XRD reflections particularly at low 2θ are highly dependent on species present in the pores. Hence, the differences in relative peak intensity of the low-angle peaks for compound 1-C and compound 1-M may indicate that the materials have some extra species in the pores, such as non-volatile reactants, partial collapse, or higher levels of interpenetration, although applicants do not wish or intend to be bound by any theory in this regard. The PXRD patterns of the materials evacuated at 110° C. overnight (compounds designated 1-C' and 1-M') show deviations from the as-synthesized materials. However, when these materials are re-solvated in DMF, the PXRD patterns are converted back to the original patterns, indicating that the materials may be distorted during evacuation, but the crystallinity and the original structure are recovered upon re-solvation.

The thermal stability of compounds 1-C and 1-M was analyzed by thermogravimetric analysis (TGA). For the TGA curves of the as-synthesized materials, the initial mass loss between 70-200° C. (~30%) is consistent with the solvent loss expected from the single crystal structural data (32.67%). This indicates that the pore volumes of both as-synthesized samples (compounds 1-C and 1-M) match that of the perfect crystal. Moreover, the frameworks are stable until approximately 400° C., where framework decomposition starts. TGA curves of 1-C' and 1-M' indicate that almost all guest solvent molecules in the framework are removed by evacuation at 110° C. under vacuum overnight.

Figure 3:
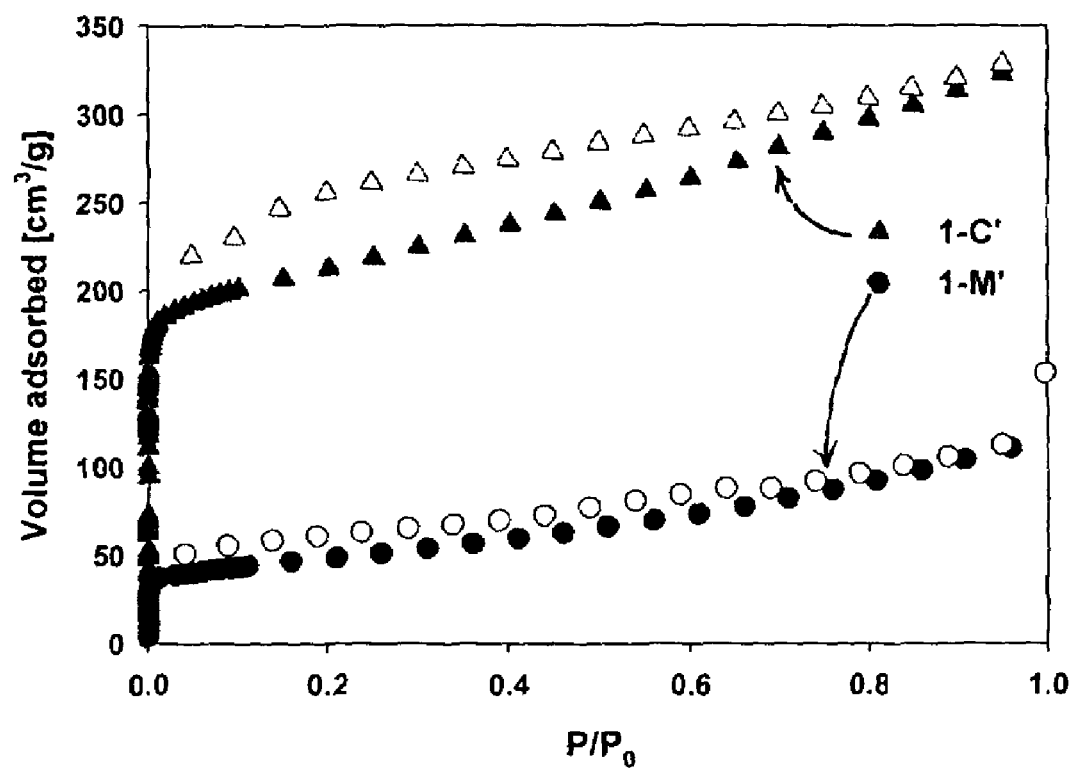
FIG. 3 are $N_2$ adsorption and desorption isotherms in compounds 1-C' and 1-M' at 77 K. Closed symbols represent adsorption, open symbols desorption.

Nitrogen adsorption and desorption isotherms at 77 K of the evacuated samples (compounds 1-C' and 1-M') are shown in FIG. 3. Based on the TGA results, the pore volumes of the as-synthesized samples (compounds 1-C and 1-M) are similar to each other and match very well with that of the perfect crystal structure. However, as shown in FIG. 3, the adsorption capacities of $N_2$ at 77 K for the evacuated samples differ considerably from one another. The evacuated microwave sample (compound 1-M') has a much lower BET surface area and DR micropore volume than the conventional sample (compound 1-C'); see Table 1. Moreover, the BET surface area and micropore volume of compound 1-C' are only half of that calculated geometrically from the perfect crystal structure. These differences may be due to pore contractions of the frameworks after evacuation. For both samples, $N_2$ adsorption/desorption isotherms show slight hysteresis.

Figure 4:
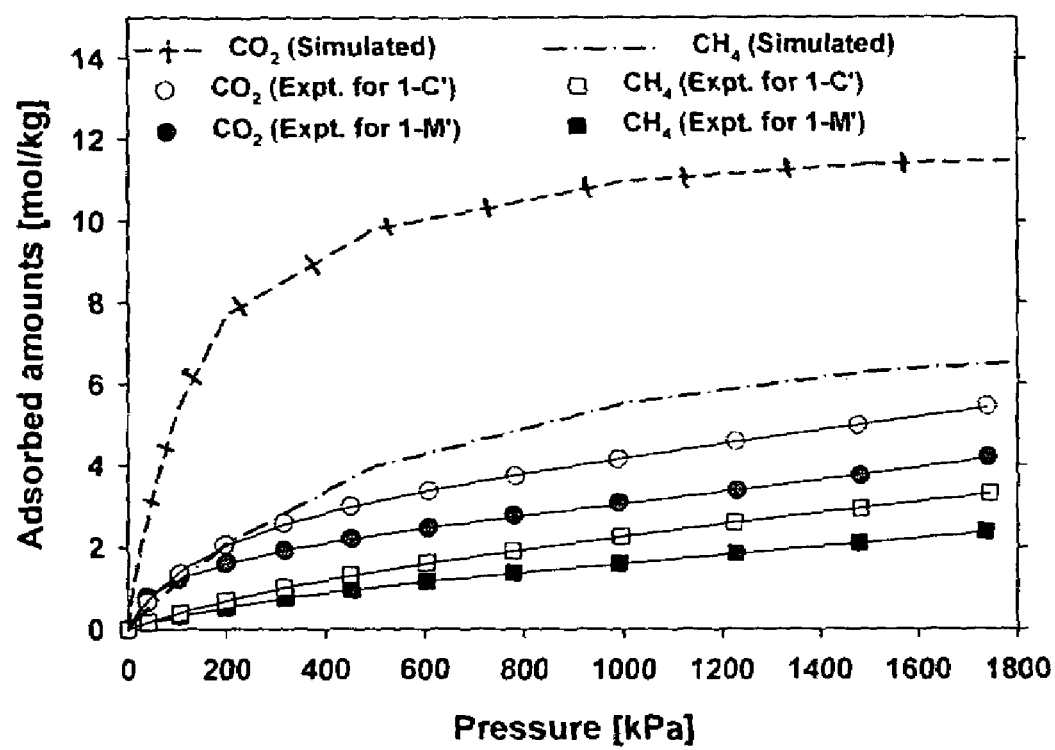
FIG. 4 shows a comparison of experimental and simulated single-component isotherms of $CO_2$ and $CH_4$ in compound 1 at 296 K. The lines through the experimental data are fits to the dual-site Langmuir-Freundlich model.

Pure Gas Adsorption Isotherms:

The adsorption isotherms of pure $CO_2$ and $CH_4$ on the evacuated samples of compounds 1-C' and 1-M' were experimentally measured up to around 18 atm at 296 K. Simultaneously, calculated adsorption isotherms for pure $CO_2$ and $CH_4$ in 1 at 296 K were obtained by GCMC simulations. FIG. 4 shows the comparison between experimental and simulated single-component isotherms of $CO_2$ and $CH_4$ in compound 1 at room temperature.

All isotherms show Type I behavior, which is a typical characteristic of microporous materials. In all three cases, $CO_2$ is more strongly adsorbed than $CH_4$, which is expected because $CO_2$ has a significant quadrupole moment whereas $CH_4$ is nonpolar. Both evacuated samples show much lower adsorption capacities for $CO_2$ and $CH_4$ than the simulated isotherms, and compound 1-C' shows slightly larger adsorption capacities for both components than compound 1-M'. The capacities show the same trends as the nitrogen micropore volumes reported in Table 1. The reduced pore volumes may be due to non-volatile reactants in the pores, partial collapse, or more interpenetration as reasoned from the PXRD patterns for as-synthesized samples (compounds 1-C and 1-M). Since the GCMC simulations have been performed for perfect crystals, these simulated isotherms overestimate the experimental data (reference 57). Hence, the discrepancy between the experimental and simulated isotherms is not unexpected.

TABLE 1

BET surface area, micropore volume, and pore size for the perfect crystal and evacuated samples 1-C' and 1-M'

| Sample | BET surface area ($m^2/g$) | Micropore volume ($cm^3/g$) | Pore size (Å) |
|---|---|---|---|
| Perfect crystal[a] | 1,761 | 0.68 | 4.9/5.8 |
| 1-C' | 802 | 0.34 | 5.0 |
| 1-M' | 167 | 0.064 | 4.7 |

[a]Geometric calculations from the single-crystal structure

Figure 5:
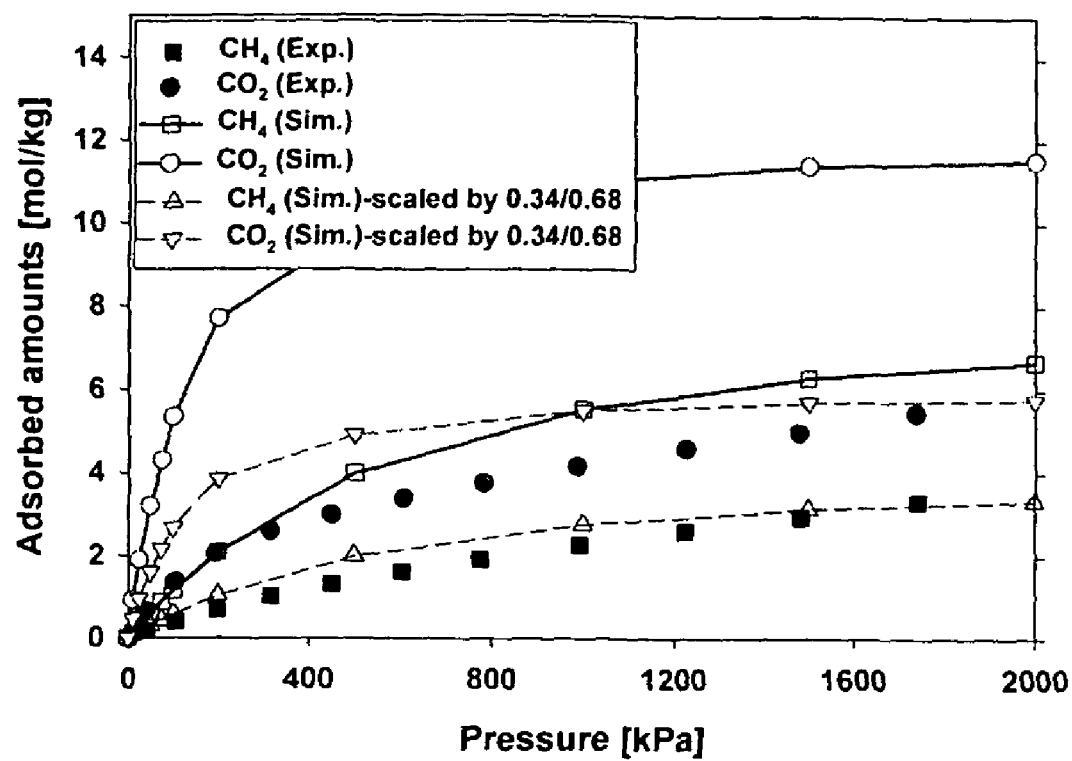
FIG. 5 shows a comparison of experimental isotherms for compound 1-C' and simulated isotherms that are scaled considering the micropore volumes in Table 1.

From Table 1, the DR micropore volume (0.34 $m^2/g$) of compound 1-C' calculated from the $N_2$ isotherm at 77 K is only half of the micropore volume (0.68 $m^2/g$) calculated geometrically from the crystal structure. In order to consider this difference, applicants applied a scaling factor (0.34/0.68=0.5) to the original GCMC isotherms. As represented in FIG. 5, the scaled GCMC isotherms match fairly well with the experimental $CO_2$ and $CH_4$ isotherms for compound 1-C', especially in the saturation regime. Similar scaling methods have already been used in some earlier adsorption studies of MOFs as described in references 18 and 57.

The DR micropore volume of compound 1-M' (0.064 $m^2/g$) calculated from the $N_2$ isotherm at 77 K is much smaller compared to the micropore volume for the perfect crystal (0.68 $m^2/g$). However, as shown in FIG. 4, the $CO_2$ and $CH_4$ isotherms of compound 1-M' do not show a decrease from the simulation of this magnitude. The $CO_2$ and $CH_4$ isotherms of compound 1-M' show much larger adsorption capacities than expected based on the surface area and pore volume derived from the $N_2$ isotherm at 77 K. In this case, the large difference between simulated and experimental isotherms cannot be solely explained by the scaling factor calculated from the $N_2$ isotherm at 77 K. It should be kept in mind that the nitrogen isotherms are measured at 77 K, but the $CO_2$ and $CH_4$ isotherms are at room temperature. For tightly constricted pores, it is possible that molecules cannot overcome the diffusional barriers within the crystals to fill the pores at low temperatures, whereas at higher temperatures diffusion occurs readily.

Binary Mixture Adsorption:

Ideal adsorbed solution theory (IAST) was used to predict binary mixture adsorption from the experimental pure-gas isotherms. It has been reported that IAST can accurately predict gas mixture adsorption in many zeolites, see references 13, 24, 25 and more recently some MOF materials, see references 13, 19. Although other theories exist for such predictions, IAST continues to serve as the benchmark for the prediction of mixed-gas adsorption equilibria from single-component isotherms (see references 13, 14, 19, 61, 62). In order to perform the integrations required by IAST, the single-component isotherms should be fitted by a proper model. There is no restriction on the choice of the model to fit the adsorption isotherm, but data over the pressure range under study should be fitted very precisely (references 13, 14). Several isotherm models were tested to fit the experimental pure isotherms for $CO_2$ and $CH_4$ in compounds 1-C' and 1-M', and the dual-site Langmuir-Freundlich equation was found to best fit the experimental data:

$$q = q_{m1} \cdot \frac{b_1 \cdot P^{1/n_1}}{1 + b_1 \cdot P^{1/n_1}} + q_{m2} \cdot \frac{b_2 \cdot P^{1/n_2}}{1 + b_2 \cdot P^{1/n_2}} \quad (1)$$

Here P is the pressure of the bulk gas at equilibrium with the adsorbed phase (kPa), q is the adsorbed amount per mass of adsorbent (mol/kg), $q_{m1}$ and $q_{m2}$ are the saturation capacities of sites 1 and 2 (mol/kg), $b_1$ and $b_2$ are the affinity coefficients of sites 1 and 2 (1/kPa), and n1 and n2 represent the deviations from an ideal homogeneous surface. FIG. 4 shows that the dual-site Langmuir-Freundlich equation fits the single-component isotherms extremely well. The $R^2$ values for all the fitted isotherms were over 0.99995. Hence, the fitted isotherm parameters were applied to perform the necessary integrations in IAST.

Figure 6A:
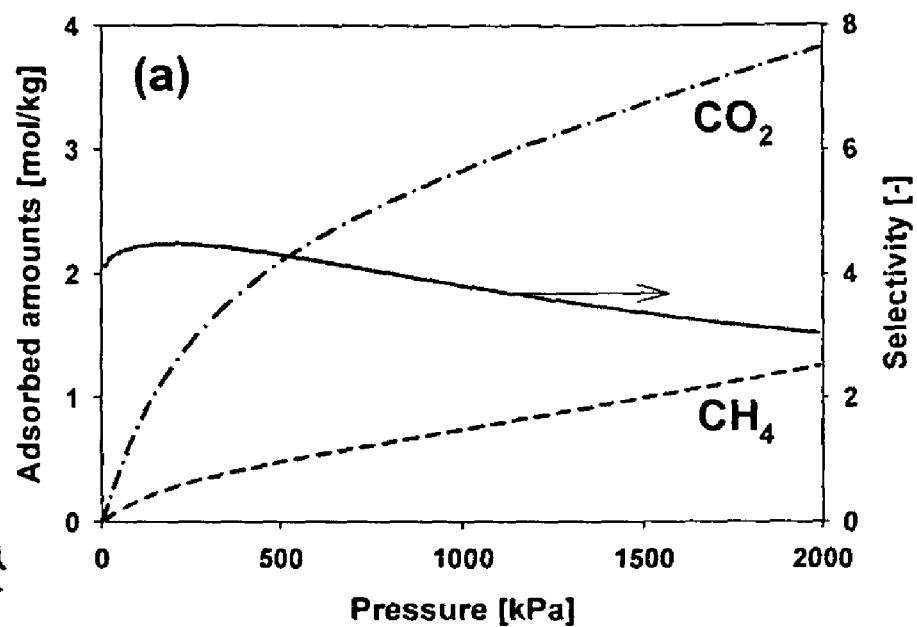
FIGS. 6a and 6b show the IAST predicted isotherms and selectivities of equimolar mixtures of $CO_2$ and $CH_4$ in (a) compound 1-C' and (b) compound 1-M' at 296 K as a function of the (total) pressure.
Figure 6B:
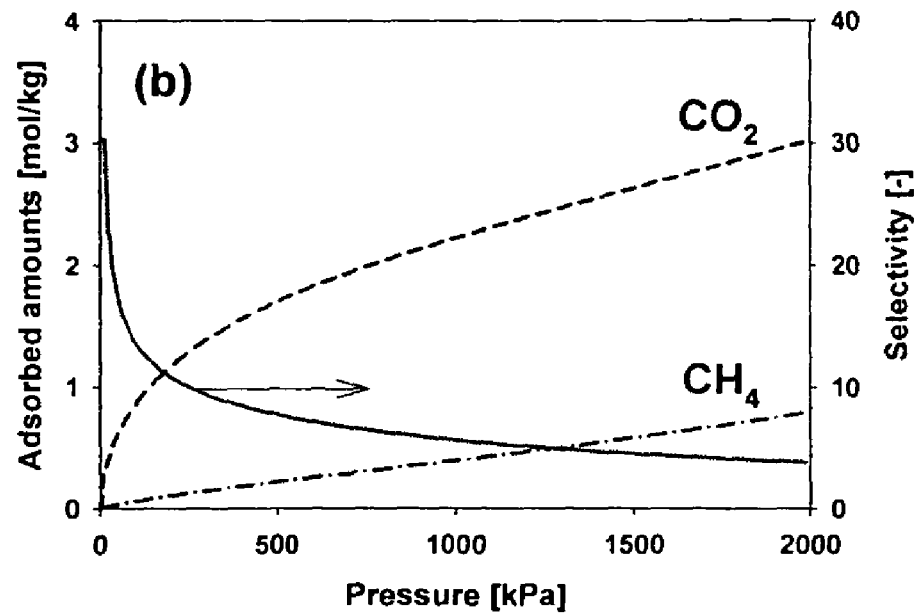

Adsorption isotherms predicted by IAST for equimolar mixtures of $CO_2/CH_4$ in compounds 1-C' and 1-M' as a function of total bulk pressure are shown in FIGS. 6a and 6b, respectively. For both samples, $CO_2$ is preferentially adsorbed over $CH_4$ because of stronger interactions between $CO_2$ and the MOF. The presence of methane does not significantly affect the adsorption of $CO_2$, but methane adsorption is much lower in the mixtures than in single-component adsorption due to competition from $CO_2$, which adsorbs more strongly. FIGS. 6a and 6b also present the predicted selectivity for $CO_2$ over $CH_4$ for the two samples. The selectivity $S_{A/B}$ in a binary mixture of components A and B is defined as $(x_A/y_A)/(x_B/y_B)$, where $x_i$ and $y_i$ are the mole fractions of component i (i=A,B) in the adsorbed and bulk phases, respectively. Note that in the Henry regime $S_{A/B}$ is identical with the ratio of the Henry constants of the two species. In the low-pressure region, the selectivity of compound 1-M' is extremely large, ~30, and the selectivity drops as pressure increases. Sample of compound 1-C' is also modestly selective for $CO_2$ over methane, and the selectivity shows only a weak pressure dependence. The different behavior in the two materials is likely due to subtle differences in the MOF structures. For both compounds 1-C' and 1-M' at very low pressures, the ratio of the $CO_2$ and $CH_4$ Henry constants is very close to the selectivity. This serves as a consistency test of the IAST calculations. The selectivities of compounds 1-C' and 1-M' are similar in the high-pressure regime, as interactions between guest molecules become more important compared to the interactions with the framework.

Figure 7:
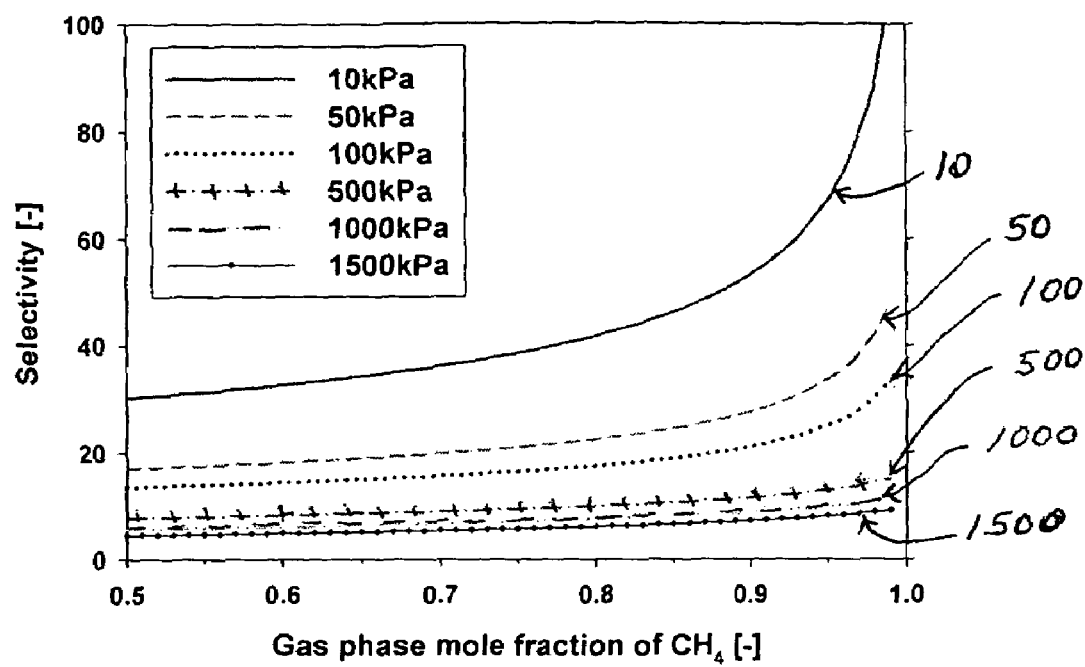
FIG. 7 shows the IAST predicted selectivities at different mixture compositions and different pressures for 1-M' at 296 K.

The IAST predicted selectivities at different mixture compositions and different pressures for compound 1-M' are shown in FIG. 7. The selectivity increases rapidly as the gas-phase mole fraction of $CH_4$ approaches unity. At $y_{CH4}=0.95$, a typical feed composition for natural gas purification, extremely high selectivities (8-67) are obtained. Even at $y_{CH4}=0.5$, the selectivity is in the range of 4-30, among the highest selectivities reported. This is much higher than the selectivities reported for other MOFs from GCMC simulations: Cu—BTC (6-10) and MOF-5 (2-3). The $CO_2/CH_4$ selectivities reported for zeolite $13X^2$ and zeolite $\beta^6$ are 2-24 and 28, respectively, at similar conditions. These results suggest that compound 1-M' is a material useful for natural gas purification, and also for $CO_2$ separation from other $CO_2/CH_4$ mixtures. Separation processes at low pressures, such as vacuum swing adsorption (VSA), could be extremely efficient using compound 1-M' because the selectivity increases dramatically with decreasing pressure. Very high selectivity can be obtained even at 1-5 atm, which are the typical pressures in pressure swing adsorption (PSA) processes.

Figure 8:
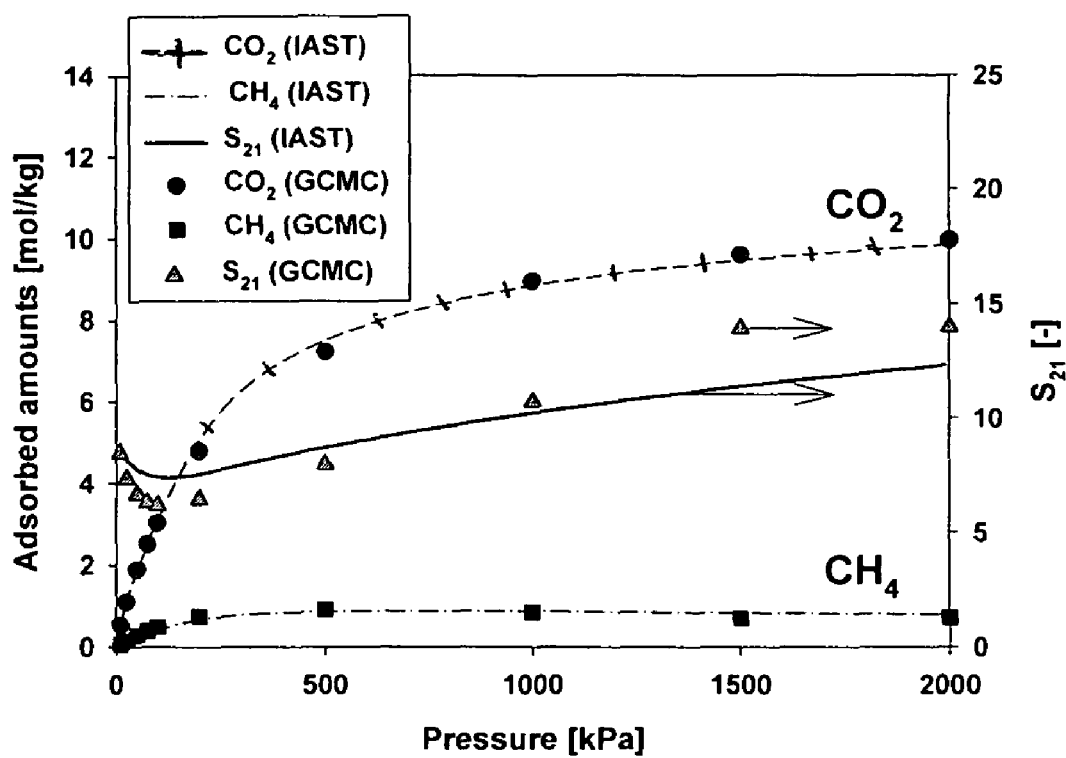
FIG. 8 is a verification of the IAST calculations by GCMC simulations for equimolar mixtures of $CO_2$ and $CH_4$ in compound 1 at 296 K. The IAST calculation was based on single-component GCMC isotherms (excess adsorbed amounts). Also, the GCMC mixture isotherms represent the excess adsorbed amounts.

Verification of the IAST Model by GCMC Simulations:

The mixture results in FIGS. 6 and 7 were obtained from single-component experimental isotherms using IAST. As the name implies, IAST assumes an ideal adsorbed phase with activity coefficients of unity for all components. IAST usually works well at low loading, it is exact in the Henry's law region, and often works at higher loadings, too. To test the applicability of IAST for the mixed-ligand MOF compound 1, applicants turned to GCMC simulation. First, GCMC single-component isotherms (excess adsorbed amounts) of $CO_2$ and $CH_4$ in compound 1 at 296 K were fed into IAST to predict the adsorption of equimolar mixtures of $CO_2$ and $CH_4$ in compound 1. Then, GCMC simulations were performed for the mixtures at the same conditions. As shown in FIG. 8, the IAST predicted mixture isotherms match very well with the GCMC mixture simulation results (excess adsorbed amounts). The selectivity is also predicted well by IAST for this system, although slight deviations are observed in the high pressure regime. In addition, the ratio of Henry constants of $CO_2$ and $CH_4$ is very close to the IAST selectivity at zero pressure as required. The excellent agreement between the GCMC mixture adsorption isotherms and the IAST results validates the use of IAST for this system and strengthens the conclusion that compound 1, and in particular compound 1-M', is a material useful for the separation of $CO_2$ from $CH_4$ gas streams.

The present invention thus provides a mixed-ligand MOF $(Zn_2(NDC)_2(DPNI))$ designated compound 1 above made by two different methods, the conventional method producing compound designated 1-C above and a microwave-assisted method producing compound designated 1-M above. The evacuated sample of compound 1-M' shows slightly lower capacity for $CO_2$ and $CH_4$ than compound 1-C', but it has much higher selectivity of $CO_2$ over $CH_4$, based upon the IAST analysis of the single-component isotherms. This is among the highest selectivities reported for $CO_2$ and methane. The applicability of IAST was verified by GCMC simulations of the binary mixture adsorption. These results suggest that compound 1-M' is useful for $CO_2/CH_4$ separations, especially for natural gas purification.

Although the invention has been described above in connection with certain illustrative embodiments, those skilled in the art will appreciate that the invention is not limited to these embodiments and that changes, modifications and the like can be made thereto within the scope of the invention as set forth in the appended claims.

REFERENCES (1) Cavenati, S.; Grande, C. A.; Rodrigues, A. E. *Energy & Fuels* 2006, 20, 2648.
(2) Cavenati, S.; Grande, C. A.; Rodrigues, A. E. *Journal of Chemical and Engineering Data* 2004, 49, 1095.
(3) Kim, M. B.; Bae, Y. S.; Choi, D. K.; Lee, C. H. *Industrial & Engineering Chemistry Research* 2006, 45, 5050.
(4) Kapoor, A.; Yang, R. T. *Chemical Engineering Science* 1989, 44, 1723.
(5) Li, Y.; Chung, T. S.; Kulprathipanja, S. *AIChE Journal* 2007, 53, 610.

(6) Li, P. Y.; Tezel, F. H. *Microporous and Mesoporous Materials* 2007, 98, 94.

(7) Li, S. G.; Falconer, J. L.; Noble, R. D. *Journal of Membrane Science* 2004, 241, 121.

(8) Peng, X.; Wang, W. C.; Xue, R. S.; Shen, Z. M. *AIChE Journal* 2006, 52, 994.

(9) Yang, R. T. *Gas Separation by Adsorption Processes*; Butterworths: Boston, 1987.

(10) Sircar, S. *Separation Science and Technology* 1988, 23, 519.

(11) Yang, R. T. *Adsorbents: Fundamentals and Applications*; John Wiley & Sons, Inc.: Hoboken, 2003.

(12) Leyssale, J. M.; Papadopoulos, G. K.; Theodorou, D. N. *Journal of Physical Chemistry B* 2006, 110, 22742.

(13) Babarao, R.; Hu, Z. Q.; Jiang, J. W.; Chempath, S.; Sandler, S. I. *Langmuir* 2007, 23, 659.

(14) Goetz, V.; Pupier, O.; Guillot, A. *Adsorption-Journal of the International Adsorption Society* 2006, 12, 55.

(15) Snurr, R. Q.; Hupp, J. T.; Nguyen, S. T. *AIChE Journal* 2004, 50, 1090.

(16) Rowsell, J. L. C.; Yaghi, O. M. *Angewandte Chemie-International Edition* 2005, 44, 4670.

(17) Mueller, U.; Schubert, M.; Teich, F.; Puetter, H.; Schierle-Arndt, K.; Pastre, J. *Journal of Materials Chemistry* 2006, 16, 626.

(18) Surble, S.; Millange, F.; Serre, C.; Düren, T.; Latroche, M.; Bourrelly, S.; Llewellyn, P. L.; Ferey, G. *Journal of the American Chemical Society* 2006, 128, 14889.

(19) Yang, Q. Y.; Zhong, C. L. *Journal of Physical Chemistry B* 2006, 110, 17776.

(20) Yang, Q. Y.; Zhong, C. L. *ChemPhysChem* 2006, 7, 1417.

(21) Myers, A. L.; Prausnitz, J. M. *AIChE Journal* 1965, 11, 121.

(22) Ma, B. Q.; Mulfort, K. L.; Hupp, J. T. *Inorganic Chemistry* 2005, 44, 4912.

(23) Talu, O. *Advances in Colloid and Interface Science* 1998, 76-77, 227.

(24) Challa, S. R.; Sholl, D. S.; Johnson, J. K. *Journal of Chemical Physics* 2002, 116, 814.

(25) Goj, A.; Sholl, D. S.; Akten, E. D.; Kohen, D. *Journal of Physical Chemistry B* 2002, 106, 8367.

(26) Düren, T.; Sarkisov, L.; Yaghi, O. M.; Snurr, R. Q. *Langmuir* 2004, 20, 2683.

(27) Garberoglio, G.; Skoulidas, A. I.; Johnson, J. K. *Journal of Physical Chemistry B* 2005, 109, 13094.

(28) Frost, H.; Düren, T.; Snurr, R. Q. *Journal of Physical Chemistry B* 2006, 110, 9565.

(29) Walton, K. S.; Millward, A. R.; Dubbeldam, D.; Frost, H.; Low, J. J.; Yaghi, O. M.; Snurr, R. Q. *J. Am. Chem. Soc.* 2008, 130, 406.

(30) Walton, K. S.; Snurr, R. Q. *J. Am. Chem. Soc.* 2007, 129, 8552.

(31) Düren, T.; Millange, F.; Ferey, G.; Walton, K. S.; Snurr, R. Q. *J. Phys. Chem. C* 2007, 111, 15350.

(32) Ni, Z.; Masel, R. I. *Journal of the American Chemical Society* 2006, 128, 12394.

(33) Dinolfo, P. H.; Williams, M. E.; Stern, C. L.; Hupp, J. T. *Journal of the American Chemical Society* 2004, 126, 12989.

(34) Mulfort, K. L.; Hupp, J. T. *Journal of the American Chemical Society* 2007, 129, 9604.

(35) Gupta, A.; Chempath, S.; Sanborn, M. J.; Clark, L. A.; Snurr, R. Q. *Molecular Simulation* 2003, 29, 29.

(36) Mayo, S. L.; Olafson, B. D.; Goddard, W. A. *Journal of Physical Chemistry* 1990, 94, 8897.

(37) Goodbody, S. J.; Watanabe, K.; Macgowan, D.; Walton, J.; Quirke, N. *Journal of the Chemical Society-Faraday Transactions* 1991, 87, 1951.

(38) Potoff, J. J.; Siepmann, J. I. *AIChE Journal* 2001, 47, 1676.

(39) Frisch, M. J.; Trucks, G. W.; Schlege, I. H. B.; Scuseria, G. E.; Robb, M. A.; Cheeseman, J. R.; Montgomery, J., J. A.; Vreven, T.; Kudin, K. N.; Burant, J. C.; Millam, J. M.; Iyengar, S. S.; Tomasi, J.; Barone, V.; Mennucci, B.; Cossi, M.; Scalmani, G.; Rega, N.; Petersson, G. A.; Nakatsuji, H.; Hada, M.; Ehara, M.; Toyota, K.; Fukuda, R.; Hasegawa, J.; Ishida, M.; Nakajima, T.; Honda, Y.; Kitao, O.; Nakai, H.; Klene, M.; Li, X.; Knox, J. E.; Hratchian, H. P.; Cross, J. B.; Adamo, C.; Jaramillo, J.; Gomperts, R.; Stratmann, R. E.; Yazyev, O.; Austin, A. J.; Cammi, R.; Pomelli, C.; Ochterski, J. W.; Ayala, P. Y.; Morokuma, K.; Voth, G. A.; Salvador, P.; Dannenberg, J. J.; Zakrzewski, V. G.; Dapprich, S.; Daniels, A. D.; Strain, M. C.; Farkas, O.; Malick, D. K.; Rabuck, A. D.; Raghavachari, K.; Foresman, J. B.; Ortiz, J. V.; Cui, Q.; Baboul, A. G.; Clifford, S.; Cioslowski, J.; Stefanov, B. B.; Liu, G.; Liashenko, A.; Piskorz, P.; Komaromi, I.; Martin, R. L.; Fox, D. J.; Keith, T.; Al-Laham, M. A.; Peng, C. Y.; Nanayakkara, A.; Challacombe, M.; Gill, P. M. W.; Johnson, B.; Chen, W.; Wong, M. W.; Gonzalez, C.; Pople, J. A. Gaussian 03, Revision C.02; Gaussian, Inc.: Wallingford Conn., 2004.

(40) Perdew, J. P.; Burke, K.; Ernzerhof, M. *Physical Review Letters* 1996, 77, 3865.

(41) Perdew, J. P.; Burke, K.; Ernzerhof, M. *Physical Review Letters* 1997, 78, 1396.

(42) Breneman, C. M.; Wiberg, K. B. *Journal of Computational Chemistry* 1990, 11, 361.

(43) Bondi, A. *Journal of Physical Chemistry* 1964, 68, 441.

(44) Sagara, T.; Klassen, J.; Ganz, E. *Journal of Chemical Physics* 2004, 121, 12543.

(45) Mueller, T.; Ceder, G. *Journal of Physical Chemistry B* 2005, 109, 17974.

(46) Yang, Q. Y.; Zhong, C. L. *Journal of Physical Chemistry B* 2006, 110, 655.

(47) Nicholson, T. M.; Bhatia, S. K. *Journal of Physical Chemistry B* 2006, 110, 24834.

(48) Myers, A. L.; Monson, P. A. *Langmuir* 2002, 18, 10261.

(49) Hafizovic, J.; Bjorgen, M.; Olsbye, U.; Dietzel, P. D. C.; Bordiga, S.; Prestipino, C.; Lamberti, C.; Lillerud, K. P. *Journal of the American Chemical Society* 2007, 129, 3612.

(50) Biradha, K.; Fujita, M. *Angewandte Chemie-International Edition* 2002, 41, 3392.

(51) Maji, T. K.; Matsuda, R.; Kitagawa, S. *Nature Materials* 2007, 6, 142.

(52) Lee, E. Y.; Jang, S. Y.; Suh, M. P. *Journal of the American Chemical Society* 2005, 127, 6374.

(53) Kitaura, R.; Seki, K.; Akiyama, G.; Kitagawa, S. *Angewandte Chemie-International Edition* 2003, 42, 428.

(54) Zhao, X. B.; Xiao, B.; Fletcher, A. J.; Thomas, K. M.; Bradshaw, D.; Rosseinsky, M. J. *Science* 2004, 306, 1012.

(55) Chen, B.; Ma, S.; Zapata, F.; Lobkovsky, E. B.; Yang, J. *Inorg. Chem.* 2006, 45, 5718.

(56) Kondo, A.; Noguchi, H.; Carlucci, L.; Proserpio, D. M.; Ciani, G.; Kajiro, H.; Ohba, T.; Kanoh, H.; Kaneko, K. *J. Am. Chem. Soc.* 2007, 129, 12362.

(57) Dubbeldam, D.; Frost, H.; Walton, K. S.; Snurr, R. Q. *Fluid Phase Equilibria* 2007, 261, 152.

(58) Garrido, J.; Linares-Solano, A.; Martin-Martinez, J. M.; Molina-Sabio, M.; Rodriguez-Reinoso, F.; Torregrosa, R. *Langmuir* 1987, 3, 76.

(59) Lozano-Castello, D.; Cazorla-Amoros, D.; Linares-Solano, A. *Carbon* 2004, 42, 1233.
(60) Nguyen, T. X.; Bhatia, S. K. *Journal of Physical Chemistry C* 2007, 111, 2212.
(61) Murthi, M.; Snurr, R. Q. *Langmuir* 2004, 20, 2489.
(62) Wu, J. Q.; Zhou, L.; Sun, Y.; Su, W.; Zhou, Y. P. *AIChE Journal* 2007, 53, 1178.
(63) Sircar. *J. Chem. Soc. Faraday Trans.* 1 1985, 81, 1527.

The invention claimed is:

1. A method of separating carbon dioxide from a gas mixture, comprising contacting the mixture and a material having a mixed-ligand, metal-organic framework that includes dicarboxylate ligands and dipyridyl ligands wherein the material selectively adsorbs carbon dioxide.

2. The method of claim 1 wherein the material is represented by the formula $Zn_2(NDC)_2(DPNI)$ where NDC represents 2,6-naphthalenedicarboxylate and DPNI represents N,N'-di-(4-pyridyl)-1,4,5,8-napthalene tetracarboxydiimide.

3. The method of claim 2 including using the material made by heating reactants in a fluid heating bath.

4. The method of claim 3 wherein the reactants comprise $Zn(NO_3)$, $H_2NDC$, and DPNI in a solvent.

5. The method of claim 2 including using the material made by microwave heating of reactants.

6. The method of claim 5 wherein the reactants comprise $Zn(NO_3)$, $H_2NDC$, and DPNI in a solvent.

7. The method of claim 1 wherein said gas mixture includes a hydrocarbon gas.

8. The method of claim 7 wherein the hydrocarbon gas comprises methane, propane, and/or propylene.

9. The method of claim 1 that separates carbon dioxide from natural gas.

10. The method of claim 1 that separates carbon dioxide from landfill gas.

11. The method of claim 1 further including the step of substantially reversible carbon dioxide desorption from the material.

12. The method of claim 1 that uses the pressure swing adsorption process for separation of the mixture.

* * * * *